United States Patent Office 3,331,773
Patented July 18, 1967

3,331,773
PROCESS FOR INHIBITING PRECIPITATION IN WATER
Lewis O. Gunderson, Morton Grove, and Herman Kerst, Des Plaines, Ill., assignors to W. R. Grace & Co., New York, N.Y., a corporation of Connecticut
No Drawing. Filed July 22, 1966, Ser. No. 567,086
15 Claims. (Cl. 210—58)

This application is a continuation-in-part of our co-pending application Serial No. 449,266 filed Apr. 19, 1965, now abandoned which is, in turn, a continuation-in-part of application Ser. No. 124,350, filed July 17, 1961, which was copending therewith and is now abandoned.

The present invention relates to improved polymers which have chelating and/or sequestering properties; that is, they are able to attach themselves to metallic ions and thereby deactivate the ion from further reactions in the medium involved.

When a metal ion combines with an electron donor, the resulting substance is said to be a complex, or coordination compound. If the substance which combines with the metal contains two or more donor groups so that one or more rings are formed, the resulting structure is said to be a chelate, and the donor is said to be a chelating agent. When the resulting chelate is stable and substantially water soluble, the substance is termed a sequestering agent.

Complexes and chelates are formed by nearly all of the metals of the Periodic system. Although the number of known chelating and complexing agents is very large, the donor atoms which undergo combination with the metal are restricted to the strongly non-metallic elements of Groups V and VI. Of these elements, nitrogen, oxygen, phosphorous, and sulphur are the only common examples.

The compositions used in the process of the present invention are particularly useful for the treatment of water to inhibit or reduce precipitation of calcium and magnesium salts such as carbonates and sulfates from the water.

The compositions used in the present invention can be broadly described as water-dispersible sequestering resins containing repeating chelating groups. The resins may be truly water soluble, colloidally soluble, or rendered dispersible by the addition of suitable surface active materials. To put it another way, the resins are molecularly and/or colloidally soluble in water. The resins have particular applicability to the treatment of water for the prevention of scale because they behave as hydrophilic colloids which interfere with the crystallization of calcium and magnesium compounds in the aqueous medium. Even when the resulting sequestered product of the resin and the deactivated ion is settled, it does not form scale, but, rather, forms a highly-solvated coacervate which does not pack and remains reasonably fluid.

An object of the present invention is to provide a process for preventing precipitation of hardness compounds from water with improved water-dispersible chelating polymeric-hydrophilic colloids. A further object of the invention is to provide water-dispersible polymers having sequestering properties capable of deactivating calcium and magnesium ions in aqueous systems. A further object of the invention is to provide a water soluble and/or water-dispersible sequestering resin which has all of the desirable properties of the hydrophilic colloid when dispersed in water, including "threshold" effects, that is, these are effective in concentrations less than would be stoichiometrically required to form complexes with the hardness cations.

Other objects and features of the present invention will be apparent to those skilled in the art from the following more detailed explanation.

Water-soluble chelating compounds are well known in the art, and are represented by such compounds as the amino acids and derivatives, such as ethylenediaminetetraacetic acid or other polyalkylenepolyaminepolyacetic acid compounds, including the polyacids of the alkylol substituents of the polyamines. Other chelating compounds have active groups consisting of carbonyl radicals, sulfonic acid radicals, amine radicals, phosphonic acid radicals, and the like. In accordance with the present invention, these chelating compounds are built up into water-dispersible polymers either by grafting them into already-formed-water-soluble polymers or by homopolymerization or copolymerization of the olefinic derivatives with monomers which themselves form water-dispersible polymers. The chelating agent is transformed into the water-dispersible polymeric form without substantially affecting the chelating and/or sequestering ability of the original compound, and usually increasing the colloidal "threshold" effects.

Briefly stated, the "threshold" treatment of water is that technique by means of which less than stoichiometric quantities of the treating agent are added to interfere with the growth of crystal nuclei and thereby prevent the deposition of insoluble deposits. The term is usually applied to the treatment of water with polyphosphates, and is discussed in references such as U.S. Patent No. 2,038,316, and the article by Reitemeier and Buehrer in the Journal of Physical Chemistry, volume 44, pages 535 to 574 (1939). Additional explanation of the threshold effects will be found in the publications of Hatch and Rice appearing in the Industrial and Engineering Chemistry of January 1939 and August 1945.

The water-dispersible chelating polymeric-hydrophilic colloids of this invention may be prepared by various means, such as by modifying a water-soluble polymer having an aliphatic hydrocarbon backbone with appended polar radicals, e.g., polyacrylonitrile, polyacrylates, polyvinyl alcohol, poly - 2 - hydroxyethyl methacrylate, poly-2-hydroxypropyl acrylate, etc., or one having a polar backbone such as a polycarbonate and polyurethane. A convenient procedure is to partially hydrolize the polyacrylonitrile to the amide, which is then cyanomethylated with formaldehyle and sodium cyanide. The cyano groups are then hydrolyzed in the presence of alkali to form the sodium salt of the carboxymethylated compound. Or the polyacrylonitrile may be hydrogenated to the amine which is then cyanomethylated, as above, and subsequently hydrolyzed in the presence of alkali to produce the amino acetic acid. These procedures produce the essential chelating ligands in the modified polymer.

This invention comprises the introduction of a polar radical into any of the polyalkylene polyamines and ethanol derivatives thereof, which polar radical is reactive with conventional polar polymers to permit the grafting of the polyalkylenepolyamine compound into the water-soluble polymer or copolymer at any desired frequency and at any desired spacing of such polyamine radicals. Then, after the grafting of the polyalkylenepolyamine radicals into the water-soluble polymer or copolymer is completed, the resulting resin is carboxymethylated to introduce the effective chelate ligands into the polymer or copolymer.

Such carboxymethylation is accomplished by known means, such as by reaction with sodium monochloroacetate, or by reaction with formaldehyde and sodium cyanide. The cyano groups are then hydrolyzed in the presence of alkali to the sodium salt of the carboxymethylated compound.

As an example, diethylenetriamine may be reacted with one mol of monochloracetic acid to introduce the acetic acid radical into the polyamine. This compound, after treatment with phosphorous pentachloride to form the mono-acid chloride, may then be grafted, for instance, into a polyallylamine to space the grafted chelate group at approximately every third amine group in the polymer chain. After the diethylenetriamine derivative is grafted into the polyallylamine polymer, the product may then be carboxymethylated as per the procedure above. This produces repeating units of the chelating polyaminepolyacetic acid ligands to produce a unique chelating and sequestering water-soluble hydrophilic colloid.

It is realized that some of the amino groups of the polyallylamine polymer may also be carboxymethylated. However, the diethylenetriaminepolyacetic acid group is considered far more efficient as a known chelating-sequestering group than is the carboxymethyl radicals in the main allylamine chain.

Of course, there is great latitude in producing the copolymers comprising various percentages of the allylamine groups, together with the polar radicals of the copolymerizing monomers such as methacrylonitrile, acrylamide, methacrylic acid, vinylpyrrolidone, vinyl acetate (alcohol), etc., which contribute other carboxyl radicals, amide radicals, hydroxyl radicals, nitrile radicals, etc., as added chelate ligands. The important aspect of this chelating-sequestering colloid is that the original configuration of well-recognized chelating ligands of the polyaminepolyacetic acid is retained in the polymer or copolymer. The mol ratio of the various monomers may be varied to suit requirements, such as 1:1, 1:1:1, 1:2:1, 5:1 to 1:5 etc.

This repeating polyaminepolyacetic acid graft polymer is highly effective as a water treatment colloid in boiler water treatment, cooling water treatment, or other heat exchange systems for interfering with crystal formation and preventing scale formation and corrosion, besides producing a highly solvated sludge coacervate.

The versatility of this type of compound can be extended by utilizing any one of the mono-olefinic polyalkylenepolyamines and alkanol derivates in conjunction with any combination of polymerizable monomers and copolymerization thereof.

The above procdures effectively introduce the best known chelating agents practically unaltered into water-dispersible polymers to produce chelate hydrophilic colloids eminently useful for purposes of treating water to prevent scale formation and corrosion, and to condition sludges, mud, silt and other solids materials to a fluid, flowable condition.

Still another method of producing water-dispersible polymeric chelating-hydrophilic colloids for water treatment is to introduce into a chelating compound or "potential" chelating compound an ethylenically unsaturated radical that is polymerizable or copolymerizable with one or more water-soluble monomers to produce a water-dispersible polymeric chelating-hydrophilic colloid. By "potential" chelating compound is meant one having radicals that can be readily converted to chelating ligands, e.g., nitrile radicals, which by hydrolysis and carboxymethylation become acetic acid ligands.

In order to produce an efficient water-dispersible chelate resin it is necessary that the functional groups forming the claws of the chelate groups should be present in a suitable steric arrangement. The only sure, practical method of preparing a polymer possessing the effective chelating claws is to ascertain if they will be present in their original configuration in the repeating unit, such as the polyaminepolyacetic acid group, or in other chelating groups such as in the nitrilodiacetic acid. It is recognized that it is possible to introduce polar groups into a compound or resin to create chelating properties when properly arranged or oriented in relation to adjacent polar radicals, but the incidence of the formation of effective chelating groupages would be a matter of happenstance or coincidence in the periodicity of the formation of ligands and in the orientation of the polymer chains. Our invention avoids this uncertainty in providing the repeating chelating unit or units in a polymer chain to bring about high chelating and/or sequestering efficiency. Also, it is recognized that in the instant invention it is possible to introduce a variety of types of chelating groups to produce a resin that effectively complexes various types of metal ions in accordance with specific affinities. In fact, it is possible that both cationic and anionic groups may appear in the same resin chain to provide an amphoteric type of water-soluble chelating polymer.

Another versatile method of preparing the composition of this invention comprises the introduction of an ethylenically unsaturated radical into known chelating compounds or radicals, or compounds that can be easily converted into chelating compositions after the completion of polymerization or copolymerization. For instance, olefinic chelating compounds comprising carboxymethyl amino radicals resist polymerization by ordinary means, and, therefore, many basic compounds can be first subjected to polymerization and then subsequently reacted to introduce the carboxymethyl radicals. A case in point is the N,N-dipropionitrile vinylacetamide, $CH_2{:}CHCHCON(CH_2CH_2CN)_2$, which amide compounds can be polymerized or copolymerized, after which the cyano groups of the compound are hydrolyzed in the presence of alkali to the sodium salt of the carboxymethylated compound of the polyamide.

Similarly, copolymers of monovinylethylenediamine can be made with one or more ethylenically unsaturated polar monomers that bring into chelating association various polar radicals that cooperate as chelate ligands, e.g., methacrylic acid, acrylamide, acrylonitrile, allylamine, 2-hydroxyethylacrylate, vinylpyrrolidone, vinyl pyridine, styrene sulfonate, maleic anhydride, vinyl acetate, and N-vinyl-diethylenetriaminetriacetamide. The copolymer is then partially carboxymethylated with formaldehyde and sodium cyanide in the presence of alkali to produce the sodium salt of the carboxymethylated polymer compound.

While it is impossible to set forth a complete structural formula for the polymers of this invention, as it is for any complex polymer, the following characterization of the polymers is believed to be accurate. The polymers of the present invention may be represented by the general formula:

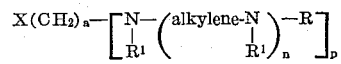

where X is an aliphatic polymeric backbone having reactive sites thereon for the attachment of the chelating ligands defined by the structure within the barckets, $n$ is an integer from 0 to 5, $a$ is 0 or 1, R is $(CH_2)_m COOH$, $R^1$ is selected from the group consisting of $(CH_2)_m COOH$, $(CH_2)_m OH$ and H, $m$ is an integer from 1 to 4, the alkylene group contains from 1 to 3 carbon atoms, and $p$ represents the percent of said reactive sites occupied by said ligands and has a value of 5 to 100, the molecular weight of X being in the range from 1000 to 1,000,000, and being sufficiently low so that the resulting polymer is still water dispersible.

It is important for the purposes of the present invention that the polymeric backbone consist essentially of C—C linkages, and that there be no carbonyl substituents attached directly to the C—C linkages of the backbone. Such substituents are, however, permissible if they are separated from the backbone by a non-carbonyl carbon atom, as, for example, in the case of a backbone containing polyallyl amide groups. It will be understood that the groups indicated above within the brackets are distributed at random throughout the polymeric molecule, and that the alkali metal salts of these polymers, such as the sodium salts, are also included within the scope of this invention.

The particularly preferred polymers are those in which X is a hydrocarbon backbone resulting from the polymerization of short chain (2 to 3 carbon atoms) unsaturated monomers such as vinyl, acrylic, or allyl compounds and R is preferably $CH_2COOH$ or $CH_2CH_2COOH$ or salts thereof.

The particularly preferred class of agents, introduced into a polymer to which the present invention is applicable, comprises the well-known amine chelating agents including ethylenediamine triacetic acid, diethylenetriamine tetraacetic acid, ethylenediamine tetraacetic acid, triethylenetetramine triacetic or tetraacetic acid, and various nitriloacetic acids in the form of their sodium salts, e.g. nitrilodiacetate $NH(CH_2COONa)_2$. The monoolefinic derivatives of the basic amine compounds can be conveniently prepared by reacting one molar proportion of the amine, e.g., ethylene diamine, with one mol of an olefinic alkylhalide, e.g. vinyl chloride or allyl chloride, bromide, or iodide. While the reaction conditions vary, depending on the particular materials employed, this condensation reaction can usually be carried out under reflux at temperatures of about 50–80° C., and times on the order of 4 hours. The reaction product or hydrochloride thereof is then polymerized or copolymerized with water-soluble monomers, such as vinyl acetate. Typical reaction conditions include temperatures on the order of 50–100° C., in the presence of a peroxide catalyst. The polymer is then carboxymethylated with formaldehyde and sodium cyanide, as for example, in accordance with the method of Bersworth U.S. Patent 2,387,735, in the presence of alkali, to the sodium salt of the carboxymethylated polyamine chelating polymer.

Another type of useful monomer for producing the polymers of the present invention results from the reaction of allyl amine with glycine dipropionitrile, which amide is then homopolymerized, followed by hydrolysis of the cyano radicals to the amide which is then carboxymethylated in presence of alkali as already described.

Carbonyl-containing chelating compounds suitable for further polymerization can be prepared in a similar manner. One such compound results from condensing allyl amine with one mol of citric acid to produce the amide, the sodium salt of which may be homopolymerized to produce an effective polymeric chelating copper sequestrant.

It is also possible to introduce a variety of polar radicals into the chelating compound, as, for example, by reacting diethanolamine with vinyl chloride, neutralizing the acid, and extracting the vinyl compound. Further reacting the product with sodium monochloracetate will produce N-vinyl, N,N-dihydroxyethylglycine sodium salt quaternary ammonium chloride. The resulting monoolefinic compound includes a carboxylic acid group, a quaternary amino radical, and two hydroxyl groups, all effective chelating ligands. The homopolymer and copolymers with a water-soluble monomer, e.g., sodium methacrylate, produces a versatile water treating hydrophilic colloid.

The compound, N,N-dihydroxyethylglycine, may be condensed with one mole of allyl amine to produce the amide and this monomer may be homopolymerized to a medium viscosity polymer useful for treating water. The monomer can also be copolymerized with methacrylamide and methacrylates to form a broad spectrum chelating resin. The copolymers may be partially carboxymethylated to increase possible coordination complexes.

Typical monoolefinic compounds capable of undergoing homopolymerization or copolymerization in the formation of polymers which may be modified by hydrolysis and/or carboxymethylation to form water-dispersible chelting polymers are listed below:

(1) N - vinyl, N,N - dihydroxyethylsodiumglycinate quaternary ammonium chloride:

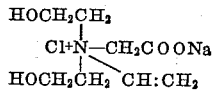

(2) N,N-dihydroxyethylglycineallylamide:

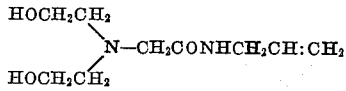

The chelting polymer or copolymer may be partially carboxymethylated or used as is for treating water.

(3) Vinyl thiourea:

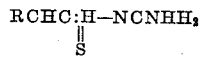

where R is H or an alkyl radical having 12±6 carbon atoms.

(4) Vinyl dithiooxyamide:

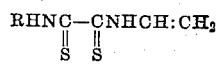

where R is H or alkyl radicals having 12±6 carbon atoms.

(5) N - allylethylenediaminetetramethylacetate quaternary ammonium iodide:

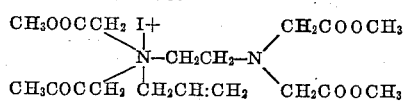

Although the lower homopolymers of Compounds 3 and 4 may be useful as copper sequestering agents, they are relatively insoluble, and, therefore, their uses will be restricted. However, these compounds may be copolymerized with water-soluble polymerizable olefins like sodium acrylate, sodium methyacrylate, 2 - hydroxyethylene acrylate, vinyl acetate, vinyl pyridine, vinyl pyrrolidene, etc., to produce water-soluble chelting agents having various amounts of the above-mentioned copper chelting olefins useful for treating cooling water and/or boiler water, for sequestering copper to prevent redeposition of copper on steel and iron surfaces and subsequent accentuation of galvanic corrosion. Also, these compounds are useful in the acid cleaning of boilers and/or heat exchange systems for the removal of iron oxide-copper oxide complex scale where redeposition of copper on the steel is a serious problem. The copper is sequestered, thus removing copper ions from solution, thereby preventing their incorporation in scale deposition.

(6) N - vinyltriethylenetetraminetetraphosphonic acid, methyl ester:

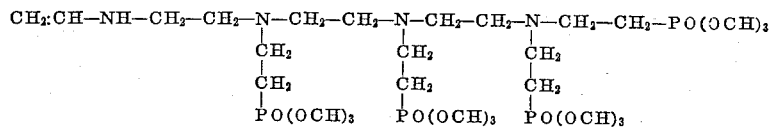

(7) N - allyltriethylenetetramine - N,N',N'',N'''-dihydroxyethyltriphosphonic acid, methyl ester:

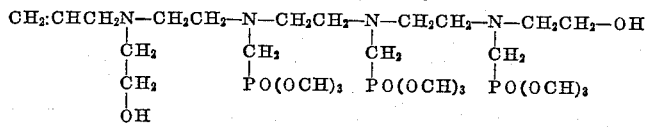

These polyphosphonatepolyamine compounds, described in Bersworth U.S. Patents 2,599,807 and 2,609,390 represented by Compounds 6 and 7, can be homopolymerized or copylymerized as described above with subsequent hydrolysis to produce a polymeric chelting colloid for chelation or sequestration of iron, exhibiting good stability at pH 11. These compounds are also efficient chelating agents for the alkaline earth metals and exhibit a greater stability than the corresponding carboxylic acid compounds.

(8) N - vinyl - hydroxyethylethylenediamine-diacetamide:

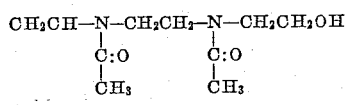

This compound may be copolymerized with Compounds 3 or 4 to produce an efficient water soluble chelating sequestering colloid for copper scavenging.

(9) N-vinylpropylenediaminediacetamide:

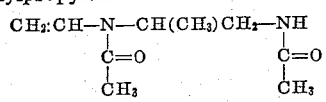

The homopolymers of the Compounds 8 and 9, and copolymers with polymethacrylate produce chelating hydrophilic colloids very useful for treating cooling waters and/or boiler waters to sequester polyvalent ions and inhibit crystal formation so that scale deposition on cooling towers, heat exchange systems and steam generating systems will not occur. Also, Compounds 8 and 9 may be copolymerized in a manner similar to that described under Compound 4 to produce highly water-soluble hydrophilic chelating colloids useful generally for treating cooling water and/or boiler water.

The water-soluble olefinic compounds useful in formulating the water-dispersible chelating resins of this invention by copolymerization include the following:

Acrylic acid
Methacrylic acid
Acrylamide
Methacrylamide
Acrylonitrile
Methacrylonitrile
Vinyl pyridine
Vinylpyrrolidone
Styrene sulfonic acid
Vinyl acetate
Maleic acid
Meleic anhydride
Allyl amine
Di-allylamine
Allyl pyridine
Partially hydrolyzed acrylonitrile
Allyldimethyloctadecylammonium chloride
Aconitic acid
Crotonic acid
Itaconic acid
Citraconic acid
Mesaconic acid
2-hydroxyethylmethacrylate
2-hydroxypropylacrylate It is understood that any applicable salts or ester of any of the above monoethylenically unsaturated compounds may also be used in producing the copolymers. Any one of these monomeric compounds can be used to form copolymers with one or more monoolefinic chelating compounds; or, two or more of the above polymerizable monomers may be used to copolymerize with one or more of the ethylenically unsaturated chelating agents. Also, any two or more of the ethylenically unsaturated chelating compounds may be copolymerized to produce more versatile and broad spectrum chelating polymers which are soluble in water.

The following are detailed examples of the preparation of some of the polymers embodied in the present invention, for purposes of illustration.

*Example 1.—Preparation of dicarboxymethylated polyacrylamide*

In a three-necked flask about 200 ml. toluene and 0.9 g. benzoyl peroxide were placed. The mixture was stirred and heated until the peroxide had dissolved and 40.0 g. (0.44 M) of acrylyl chloride were added. This mixture was stirred and heated at 85–90° C. for 3 hours. Some of the polyacrylyl chloride separated. In a separate container, about 42.3 g. (0.44 M) of iminodiacetonitrile was dissolved in pyridine and 100 ml. of toluene by heating on a hot water bath. The previously prepared mixture containing polyacrylyl chloride was cooled to 60° C., and the warm pyridine-iminodiacetonitrile solution was added rapidly with cooling. The reaction mixture was stirred and heated at 70–80° C. for two hours, after which it was cooled to room temperature and the supernatant liquid was poured off. The residue was washed with 100 ml. water and treated with 180 ml. water. The mixture was stirred and heated to hydrolyze the nitrile at 80° C. for 7 hours. The residual toluene and pyridine was removed under reduced pressure and the mixture was concentrated. After about 6 hours, when the odor of pyridine was no longer detected, the mixture was poured into 1 liter methanol and a little acetone, and set aside overnight. The supernatant liquid was poured off, and the residue was freed from solvents under vacuum and dried in a vacuum desiccator over sulfuric acid. The resulting polymer presumably had the following recurring groups:

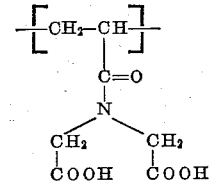

Dicarboxymethylated polyacrylamide prepared according to the above procedure, or according to an alternate procedure carried out by reacting sodium cyanide, formaldehyde, and polyacrylamide, was tested for chelating activity by the standard oxalate titration method which is used for the evaluation of compounds such as ethylenediamine tetraacetic acid. The various preparations chelated anywhere from 50–75 mgs. of calcium per g. of sample. For comparative purposes, ethylenediamine tetraacetic acid tetrasodium salt will chelate 108 mgs. of calcium per g. of sample. On the other hand, polyacrylamide chelates practically no calcium per g. of sample.

These materials were also tested by the so-called threshold test which is carried out as follows:

A solution of calcium bicarbonate containing 16 grains per gallon of hardness is adjusted to a pH of about 7.3. At the beginning of a test containing 100 ml. of this solution, 2 ml. of tenth normal sodium hydroxide are added. The pH rises to approximately 9.2, and under continuous stirring calcium carbonate begins to precipitate, and the pH of the solution drops within a few minutes to around 8. In order to check the so-called threshold effectiveness of materials such as polyphosphates and the chelating polymers which show the effect, a small dosage of the material to be tested is placed in the 100 ml. of solution before the tenth normal sodium hydroxide is added. The quantity used is much less than that required stoichiometrically for complete chelation of the calcium. If the dosage of the threshold treatment is sufficient, there will be no precipitation of calcium carbonate and no drop in the pH of the solution. The difference between a treated solution and a blank is obvious within 15 minutes. Under the conditions of this test the various dicarboxymethylated polyacrylamide products produced by the procedure given above show high effectiveness against the precipitation of calcium carbonate.

These materials have also been tested on the control of calcium sulfate scale deposition on surfaces of a heat transfer tube through which steam at 15 pounds pressure is passing. They show a 50–75% reduction in the amount of calcium sulfate deposited under these conditions.

The carboxymethylated polyacrylamides have also been evaluated as additives to standard corrosion control treatments in equipment used for the evaluation of cooling water treatment formulas. One of these is a small cooling tower which is operated with a circulating water corresponding to Chicago tap water concentrated 8 times. In the case of the carboxymethylated polyacrylamides, these were used in conjunction with a standard cooling water treatment containing Calgon TG (a sodium-zinc polyphosphate) and sodium tripolyphosphate. This formula normally contains a certain amount of citric acid to act as a scale control agent. Such a formula gives a corrosion rate on steel of 9 mils per year at the end of 10 days. The comparable formula in which the citric acid was replaced by an equal percentage of carboxymethylated polyacrylamide gave a corrosion rate on steel of 3.7 mils per year at the end of 10 days. There was also a 20% reduction in the amount of scale deposited on an experimental heat transfer surface contained in the circulating water system.

*Example 2.—Preparation of carboxymethylated polyallylamine*

Solutions of one mole of sodium cyanide solution in 200 ml. water and one mole of formaldehyde in 100 ml. water were prepared. About 49 ml. of polyallylamine (30.99% active solution solid as "QR–419" by Rohm and Haas) was placed in the reaction vessel followed by 50 ml. water, 0.1 M sodium cyanide solution. The mixture was stirred and heated at reduced pressure. At 50° C., 25 ml. of the diluted formaldehyde was added slowly through a dropping funnel. When the evolution of ammonia diminished, the same quantities of sodium cyanide and formaldehyde were added. This process was repeated until all the reagents were consumed. Then, 15 ml. excess formaldehyde was added to react with any unreacted cyanide. The mixture was refluxed 0.5 hours longer. The liquid product represented a 28.2% active solution. It is reasonable to assume that the polymer had the following recurring groups:

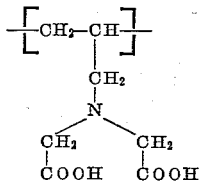

The carboxymethylated polyallylamine compounds gave an oxalate titration of about 201 mg. of calcium per g. of sample, showed full effectiveness in the threshold test at 10 p.p.m. dosage and give about 75% reduction in calcium sulfate deposition on heat transfer surfaces. The polyallylamine, itself, does not show this effectiveness.

*Example 3.—Preparation of poly(ethylenediamine triacetic acid acrylate)*

(A) *Trans esterification of "Permakleer 80" and methyl acrylate.*—The following ingredients were placed in a reaction flask fitted with a water trap topped by a reflux column:

| | |
|---|---|
| Methyl acrylate | g__ 146 |
| "Permakleer 80" (hydroxy ethylethylene diamine triacetic acid) | g__ 24.8 |
| Toluene sulfonic acid | g__ 0.8 |
| Hydroquinone | g__ 0.5 |
| Dimethylsulfoxide | ml__ 50 |

The mixture was heated to reflux (75° C.) for 9 hours, when 1–2 g. of an ion exchange resin (IR–120) was added to aid the esterification reaction. Heating was continued for 40 hours.

(B) *Polymerization of the ester.*—The solution was treated with 1 g. azo-bis-isobutyronitrile in a hot water bath while concentrating under reduced pressure. The mixture was filtered and concentrated under reduced pressure, leaving a viscous mass. The following recurring groups were probably present.

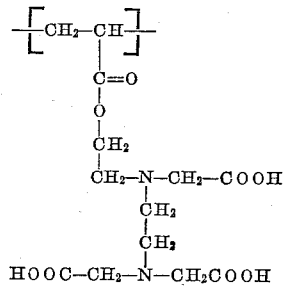

This product gave an oxalate titration figure of 70 mg. of calcium per g. of sample, and by potentiometric titration was shown to form stable copper, ferrous, and ferric complexes.

*Example 4.—Preparation of ternary copolymer of N-allyl ethylene diamine triacetic acid, acrylic acid, and vinyl acetate*

About 62.8 g. of N-allyl ethylenediamine triacetic acid was placed in the reaction flask, followed by the addition, with stirring, of 50 ml. water, 50 ml. methanol, 15 ml. ether, and 0.5 g. of azo-bis-isobutyronitrile. The mixture was heated to 55° C. and 20.6 g. vinyl acetate was added dropwise. After 6 hours, 15.7 g. acrylic acid was added dropwise while heating and stirring at 62° C. for 1.5 hours. The solution was concentrated, washed, and dried to produce a viscous mass. The copolymer probably had the following structures:

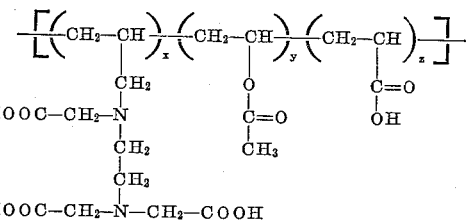

This copolymer gives an oxalate titration figure of 29 mg. of calcium chelated per g. of sample. Potentiometric titration indicates that it forms stable calcium, magnesium, copper and iron complexes.

*Example 5.—Carboxyethylated polyallylamine*

A mixture of 79 ml. of a commercial polyallylamine solution (Rohm and Haas QR–419) and 5.3 g. acrylonitrile was combined in the reaction flask to give a white emulsion. This emulsion was treated with 100 ml. of a 40% sodium hydroxide solution. The mixture was slowly heated to the vapor temperature of 60° C. After 8 hours, a light amber liquid was obtained. The solution was heated for 6 hours longer to complete hydrolysis of the nitrile and then subjected to diminished pressure to remove the ammonia. This product is an acrylonitrile adduct hydrolysate. The probable structural formula is:

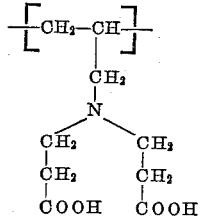

This material has been tested in various ways; it gives an oxalate titration figure of only 15 mg. of calcium chelated per g. of product, but shows definite indication of the reduction of calcium carbonate deposits on heat transfer surfaces and forms a stable copper complex as indicated by potentiometric titration.

In all of the preceding examples the mol ratios between the various polymerizable chelating agents and the non-chelating monomers can be varied over very large ranges to meet the requirements of the resulting sequestering hydrophilic colloids. For instance, if in water treatment, hydrophilic colloidal properties are desired to increase hydrophilicity, to improve flowability of mineral sludges, as well as to inhibit crystalline scale formation, then the ratio between the olefinic sequestering agent and the non-chelate polar monomer may be large, such as 1:100, or more. An example would be the copolymer covered by Example 4 and would indicate a relatively large proportion of acrylic acid and vinyl acetate compared with the proportion of N-allyl ethylenediamine triacetic acid. If such hydrophilic colloids also require considerable chelate sequestration, then the proportion of the chelate monomer would be increased in proportion to the concentration of the other monomers, and in the example mentioned this would mean a relatively large proportion of the N-allyl ethylenediamine triacetic acid in the reaction mixture.

*Example 6.—Poly(N-vinylethylenediaminetri-methylacetate)*

One mol of ethylenediamine is condensed with one mol of allyl chloride by mixing the two ingredients in a reflux flask and heating the mixture at approximately 75° C. for 4 hours to complete the reaction. The hydrochloride of the monomeric reaction product is then placed in a flask and heated to 50–100° C. in the presence of a peroxide catalyst until the polymerization is completed. The resulting polymer is then carboxymethylated with formaldehyde and sodium cyanide; as, for example, in accordance with the method of Bersworth's U.S. Patent 2,387,735, in the presence of alkali to the sodium salt of the carboxymethylated polyamine chelating polymer, which may be represented by the following formula:

Ethylenediaminetrimethylacetate

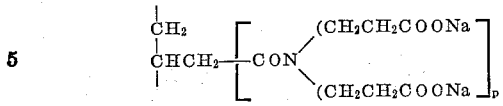

*Example 7.—Poly(N¹-allyl, N³-hydroxyethyl-di-ethylenetriaminetriacetic acid trisodium salt)*

Example 6 is repeated except for the substitution of N-hydroxyethyl-diethylenetriamine for the ethylene diamine to produce the chelating polymer which may be represented by the following formula:

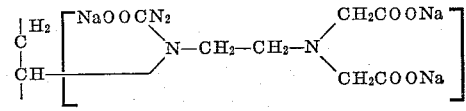

*Example 8.—Poly(N,N dicarboxyethyl vinyl acetamide disodium salt)*

Another type of useful monomer for producing the polymers of the present invention results from the reaction of vinylacetic acid with iminodipropionitrile in equal mol ratio under reaction conditions outlined in Example 6. The monomeric amide is then homopolymerized with the catalyst and reaction conditions of Example 6, followed by hydrolysis of the cyano radicals to the carboxylic acid salts to produce a polymer represented by the following formula:

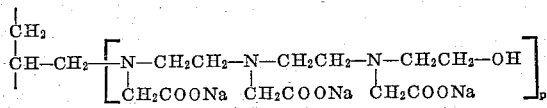

*Example 9.—Poly(dicarboxymethylated vinylacetamide)*

Another example is vinylacetamide homopolymer, which is carboxymethylated as per U.S. Patent 2,387,735, to produce a polymer having the following formula:

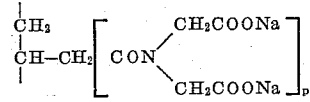

*Example 10.—Poly(mono allyl citric acid amide disodium salt)*

Carbonyl containing chelating compounds suitable for further polymerization can be prepared in a similar manner. One such compound results from condensing one mol allyl amine with one mol of citric acid to produce the amide, the sodium salt of which may be homopolymerized to produce an effective polymeric chelating copper sequestrant represented by the following formula:

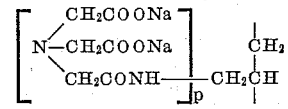

*Example 11.—Poly(N-vinyl triethylene tramine tetra-carboxymethyl tetrasodium salt)*

Another useful monomer is produced by condensing triethylenetetramine with one mol of vinyl chloride to introduce the vinyl radical in accordance with the procedure in Example 6. This monomer is then polymerized with the aid of the catalyst mentioned in Example 6 and carboxymethylated to produce a relatively low molecular weight polymer ranging from a molecular weight of 1200–3000, which polymer may be represented by the following formula.

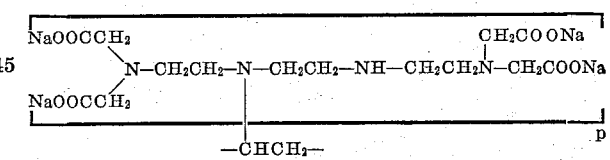

In all of the preceding examples the mol ratios between the various polymerizable chelating agents and the non-chelating monomers can be varied over very large ranges to meet the requirements of the resulting sequestering hydrophilic colloids. For instance, if in water treatment the hydrophilic colloidal properties are desired to increase hydrophilicity to improve flowability of mineral sludges, as well as to inhibit crystalline scale formation, then the ratio between the olefinic sequestering agent and the non-chelate polar monomer may be large, such as 1:100, or more. If such hydrophilic colloids also require considerable chelate sequestration then the proportion of the chelate monomer would be increased in proportion to the concentration of unwanted scale-forming salts and unwanted polyvalent metal ions in the aqueous solution.

In cases where the removal of unwanted ions is of primary concern, such as the chelation and removal of copper ions from boiler waters, boiler feedwater, or heat exchange systems, then a copolymer of such compound as 3, methacrylic acid and methacrylamide (1:1:3) is recommended since those sequestering agents have high affinity for copper, nickel and zinc.

Likewise, most of the copolymers described herein are effective sequestering agents for calcium and magnesium ions and salts, and for iron oxides commonly present in boiler feedwaters and/or boiler waters; and, therefore, these compositions are valuable in treating boiler feedwaters and/or boiler waters to alleviate problems resulting from the presence of unwanted iron oxides, copper, and aluminum ions, etc., that may enter the boiler with the feedwater. It appears that the use of these compositions will eliminate current boiler problems which are evidenced by the cracking of boiler steels and allows which some authorities attribute to the presence of various metal ions such as copper.

The use of the compositions of this invention will preclude the necessity of replacing copper, brass, and Admiralty metal tubes with ferrous metal tubes because of the problems created by the introduction of non-ferrous metal ions into the aqueous phase where such ions will create problems in all portions of the heat exchange systems or steam generating systems. Most of the compositions of this invention represented by the polymers and copolymers are quite stable and are therefore applicable for a great variety of uses under various ambient conditions.

The compositions of the invention are used in widely varying dosages depending on the medium being treated. As little as one part per million will be effective in some media, and a range of 0.5 to 200 p.p.m. and preferably above 1 p.p.m. will generally suffice for cooling water systems. Dosages in excess of 200 p.p.m. such as up to 500 p.p.m. may, however, be required in particular systems where the deactivation problems are particularly severe.

The homopolymers of copolymers of this invention can be improved as scale inhibitors and as corrosion inhibitors in aqueous solutions by the addition of a synergistic surfactant of the nature of Polyglycol 400 Monooleate (Glyco Chemical Company). The mechanism whereby the organic additive functions to improve the scale inhibition on surfaces exposed to the water, and the mechanism whereby corrosion inhibition is improved has not been ascertained; but it is presumed, and experimental evidence indicates, that such an organic additive conditions the surfaces, particularly metal surfaces, to inhibit scale formation thereon, perhaps by the preferential adsorption of the organic surfactant on the metal surface. These organic synergists are used in almost trace amounts (threshold action), such as a dosage of ½ p.p.m. to 5 p.p.m. A larger dosage may be used without detrimental effects, but is generally not necessary. Other high molecular weight glycol esters or diesters may be used in a similar fashion. Also, the polyoxy block polymers comprising polypropylene ethers and polyethylene ethers, represented by the commercial products "Pluronics" and "Tetronics" (Wyandotte Chemical Company), also function as organic synergists to improve the functions of the water-soluble sequestering resins of this invention.

The polymers of the present invention will normally be employed in conjunction with other water treating agents such as molecularly dehydrated alkali metal phosphates (which may contain other substituent metals such as zinc) or with a combination of such phosphates with alkali metal chromates. In such combinations the amount of phosphate will range from about 1 to 100 times the amount of chelating polymer, and from ⅒ to 10 times the amount of chromate. Typical formulations are given below:

| | Percent |
|---|---|
| Sodium dichromate | 73 |
| Sodium polyphosphate | 20 |
| Polyethylene glycol 400 monooleate | 2 |
| Chelating polymer | 5 |
| Sodium polyphosphate | 20 |
| Sodium dichromate | 70 |
| Chelating polymer | 10 |
| Sodium zinc polyphosphate | 60 |
| Non-ionic surfactant | 30 |
| Chelating polymer | 10 |
| Sodium polyphosphate | 90 |
| Chelating polymer | 10 |

In addition to their use in the treatment of aqueous systems for the prevention of precipitation and corrosion, the compositions of the present invention have general utility wherever it is necessary to inactivate polyvalent metals to prevent interference with a chemical process, a biological function, or a physiological function. Among the applications to which the compositions of the invention may be put are such fields as ore flotation, soil conditioning, drilling mud additives, industrial waste water treatment, coagulant aids, metal separations, demulsification agents, internal medical absorbents, evaporator treatment, and for agricultural uses. Still other fields include rust inhibition, textile processing, soaps and detergents, stabilization of substances such as fatty acids, metal finishing and plating, polymerization, and removing radioactive contamination.

It will be evident that various modifications can be made to the described embodiments without departing from the scope of the present invention.

What is claimed is:

1. A method for treating water for the inhibition of precipitation of alkali earth metal salts which comprises dispersing into said water in an amount substantially less than required stoichiometrically to react completely with alkali earth metal salts but sufficient to prevent scale formation, a water dispersible complexing polymer having the formula:

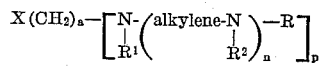

where X is an aliphatic polymeric backbone having reactive sites thereon for the attachment of the chelating ligands defined by the structure within the brackets, $n$ is an integer from 0 to 5, $a$ is an integer from 0 to 1, R is $(CH_2)_mCOOH$, $R^1$ is selected from the group consisting of $(CH_2)_mCOOH$, $(CH_2)_mOH$, and H, $m$ is an integer from 1 to 4, the alkylene group contains from 1 to 3 carbon atoms, and $p$ represents the percent of said reactive sites occupied by said ligands and has a value of 5 to 100, the molecular weight of X being in the range from 1000 to 1,000,000, and being sufficiently low so that the resulting polymer is still water dispersible.

2. The method of claim 1 wherein X is a polyvinyl polymer.

3. The method of claim 1 wherein X is a polyacrylic polymer.

4. The method of claim 1 wherein X is a polyallyl polymer.

5. The method of claim 1 wherein the chelating ligand defined within the brackets is a polyalkylene polyamine polyacetic acid.

6. The method of claim 1 wherein the polymer is a polymeric allylamino diacetic acid, said polymer having a sufficiently low molecular weight to be water dispersible.

7. The method of claim 1 wherein the polymer is a polymeric ethylenediamine triacetic acid vinyl acetamide, said polymer having a sufficiently low molecular weight to be water dispersible.

8. The method of claim 1 wherein the polymer is a copolymer of N-allyl ethylene diamine triacetic acid and vinyl acetate, in a mole ratio of 5:1 to 1:5, said copolymer having a suffiicently low molecular weight to be water dispersible.

9. The method of claim 1 wherein the polymer is a copolymer of allylamine and acrylonitrile, said copolymer being carboxymethylated and having a sufficiently low molecular weight to be water dispersible.

10. The method of claim 1 wherein the polymer is a copolymer of allylamine and an N-vinyl polyethylene polyamine polyacetic acid, said copolymer being carboxymethylated to provide a water dispersible complexing polymer.

11. The method of claim 1 wherein the polymer is a copolymer of allylamine diacetate and methacrylonitrile, said copolymer having a sufficiently low molecular weight to be water dispersible.

12. The method of claim 1 wherein X is a copolymeric allyl vinyl chain.

13. The method of claim 1 wherein the chelating ligands are diethylenetriamine tetraacetate groups.

14. The method of claim 1 wherein the chelating ligands are hydroxyethyl ethylenediamine triacetic acid groups.

15. The method of claim 1 wherein from 0.5 to 500 p.p.m. of the water dispersible complexing polymer is dispersed in the water.

References Cited

UNITED STATES PATENTS

| 2,508,718 | 5/1950 | Jones | 260—78 |
| 2,840,603 | 6/1958 | Mock et al. | 260—78 |
| 2,910,445 | 10/1959 | Mock et al. | 260—78 |
| 2,980,610 | 4/1961 | Ruehrwein | 210—58 |
| 3,099,521 | 7/1963 | Arensberg | 210—58 |

MORRIS O. WOLK, *Primary Examiner.*

M. E. ROGERS, *Assistant Examiner.*

UNITED STATES PATENT OFFICE
CERTIFICATE OF CORRECTION

Patent No. 3,331,773                                    July 18, 1967

Lewis O. Gunderson et al.

It is hereby certified that error appears in the above numbered patent requiring correction and that the said Letters Patent should read as corrected below.

Column 14, lines 28 to 30, for that portion of the formula reading $\overset{|}{R}{}^2$ read $\overset{|}{R}{}^1$ Signed and sealed this 6th day of August 1968.

(SEAL)
Attest:

Edward M. Fletcher, Jr.                              EDWARD J. BRENNER
Attesting Officer                                      Commissioner of Patents